(12) United States Patent
Sakata et al.

(10) Patent No.: US 8,013,248 B2
(45) Date of Patent: Sep. 6, 2011

(54) CORRUGATED CLAMP

(75) Inventors: Tsutomu Sakata, Yokkaichi (JP); Katsuji Suzuura, Toyota (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 484 days.

(21) Appl. No.: 12/325,618

(22) Filed: Dec. 1, 2008

(65) Prior Publication Data

US 2009/0166480 A1    Jul. 2, 2009

(30) Foreign Application Priority Data

Dec. 28, 2007 (JP) ................................. 2007-339994

(51) Int. Cl.
*H02G 3/04* (2006.01)
*H02G 3/32* (2006.01)

(52) U.S. Cl. ... 174/68.1; 174/72 A; 174/51; 174/40 CC; 248/49; 248/62; 248/71

(58) Field of Classification Search .................. 174/68.1, 174/68.3, 6, 664, 51, 72 A, 94 R, 96, 106 D, 174/40 CC, 191, 197, 663; 248/49, 62, 63, 248/74.1, 71, 73, 68.1

See application file for complete search history.

(56) References Cited

U.S. PATENT DOCUMENTS

| | | | | |
|---|---|---|---|---|
| 5,013,872 A | * | 5/1991 | Lockwood et al. | 174/663 |
| 5,390,876 A | * | 2/1995 | Hatano et al. | 248/68.1 |
| 6,595,473 B2 | * | 7/2003 | Aoki et al. | 248/74.4 |
| 6,875,918 B2 | * | 4/2005 | Sudo et al. | 174/72 A |
| 7,399,922 B2 | * | 7/2008 | Oga et al. | 174/72 A |
| 2001/0017338 A1 | | 8/2001 | Kamekawa | |
| 2004/0046088 A1 | | 3/2004 | Uchida et al. | |
| 2005/0082449 A1 | | 4/2005 | Kawaguchi et al. | |

FOREIGN PATENT DOCUMENTS

| | | |
|---|---|---|
| JP | 5-61960 | 8/1993 |
| JP | 7-104024 | 4/1995 |
| JP | 2004-166403 | 6/2004 |
| JP | 2006-296050 | 10/2006 |

OTHER PUBLICATIONS

English language Abstract of JP 2004-166403, Jun. 10, 2004.
English language Abstract of JP 7-104024, Apr. 21, 1995.
English language Abstract of JP 2006-296050, Oct. 26, 2006.

* cited by examiner

*Primary Examiner* — Angel R Estrada
(74) *Attorney, Agent, or Firm* — Greenblum & Bernstein P.L.C.

(57) ABSTRACT

A corrugated clamp includes a base section, a lid section, and a bracket section. The base section and lid section are provided on their inner peripheral surfaces with concavo-convex portions to be fitted to an annular concavo-convex portion of a corrugated tube. The bracket section projects from an exterior of the base section to be engaged with a vehicle body. A ground wire is drawn out from a wire harness extending through the corrugated tube. A core wire is exposed from the ground wire by stripping an insulation sheath of the ground wire. The exposed core wire is brought into contact with an inner surface of the concavo-convex portion of the base section and is fixed between the inner surface of the base section and an outer surface of the corrugated tube. An latch piece projected from and integrated with a vehicle body panel is inserted into and engaged with the bracket section to contact the bracket section and the vehicle body panel with each other, thereby electrically connecting the ground wire to the vehicle body panel.

9 Claims, 5 Drawing Sheets

CORRUGATED CLAMP

CROSS-REFERENCE TO RELATED APPLICATIONS

The present disclosure relates to subject matter contained in priority Japanese Application No. 2007-339994, filed on Dec. 28, 2007, which is herein expressly incorporated by reference in its entirety.

BACKGROUND OF THE INVENTION

1. Field of the Invention

The present invention relates to a corrugated clamp. Particularly, the present invention relates to a corrugated clamp configured to be mounted on a wire harness that is sheathed with a corrugated tube and is arranged in a motor vehicle and configured to secure the wire harness to the vehicle body.

2. Description of the Related Art

In the prior art, a sheath member, such as a corrugated tube, is attached to a wire harness to be arranged in a motor vehicle in order to protect the wire harness against shock and interference during driving.

The wire harness to be arranged in the motor vehicle is secured to the vehicle body. In the case of a wire harness W/H sheathed with the corrugated tube described above secured to the vehicle body, a corrugated clamp made of a resin material is attached to the corrugated tube and is secured through the corrugated clamp to the vehicle body.

Japanese Patent Document No. 2004-166403 discloses a construction for securing a wire harness to a vehicle body using such a corrugated clamp. As shown in FIG. 7 of the present application, a corrugated clamp 1 is fitted on and secured to an outer periphery of a corrugated tube T. A vehicle side tab 2a is inserted into and engaged with a tab insertion port 1a in the corrugated clamp 1 to secure the wire harness W/H to a vehicle body 2.

However, in the case where a wire harness is sheathed with a corrugated tube and the corrugated clamp fixes the corrugated tube to a vehicle body, as shown in FIG. 8 in the present application, typically a ground wire 4 in the wire harness is drawn out from the corrugated tube, a ground terminal 5 is connected to a distal end of the ground wire 4 and the ground terminal 5 is secured to and fastened on a bolt fixing aperture 3a in a vehicle body 3 by a bolt 7.

In more detail, the ground terminal 5 is press-connected to a distal end of the ground wire 4 drawn out from the wire harness. The bolt fixing aperture 3a is provided in a given position on the vehicle body 3. A nut 6 is attached to a rear side of the vehicle body 3 around the bolt fixing aperture 3a. The ground terminal 5 has an annular electrical contact portion 5a with a circular aperture 5b. The circular aperture 5b in the contact portion 5a is superimposed on the bolt fixing aperture 3a and the bolt 7 is inserted into the apertures 5a and 3a. Then, the nut 7 is screwed onto the bolt 7 to secure the bolt 7 to the vehicle body 3. Thus, the ground terminal 5 is contacted to and grounded to the vehicle body 3.

However, it is necessary not only to provide the bolt fixing aperture 3a in the vehicle body in order to perform the ground connection by using the ground wire 4 but also to carry out the step of press-connecting the ground terminal 5 to the exposed core wire of the ground wire 4 and the step of fastening the ground wire 5 on the vehicle body 3 by means of the bolt 7 and nut 6. Consequently, there is the disadvantage that these steps require much time and manpower. In particular, since there are ten to fifty positions on average to be connected to the ground in a motor vehicle and there are about a thousand positions to be fastened by the bolts in a motor vehicle, reduction of the step of fastening the bolts has been eagerly required in order to improve efficiency.

Since the step of ground-connecting the wire harness W/H to the vehicle body is independent of the step of securing the wire harness to the vehicle body, this will lower efficiency in assembly. In addition, since the ground connection on the vehicle body requires many ground terminal 5, bolts 7, and nuts 6, and the attachment to the vehicle body requires the corrugated clamps 1, there are disadvantages in that the number of parts, the cost, and the weight will be excessively high.

SUMMARY OF THE INVENTION

The present invention is provided to address the above described disadvantages in the prior art. In view of the above problems, an object of the present invention is to provide a corrugated tube in which, in the case of a wire harness sheathed with a corrugated tube and the corrugated tube secured through the corrugated clamp to a vehicle body panel, a ground wire in the wire harness that may be ground-connected to a vehicle body during the time of the step of securing the corrugated clamp to the vehicle body panel, thereby eliminating a step of fastening the ground wire to the vehicle body panel by bolts.

In order to accomplish the above and other objects, the present invention is directed to a corrugated clamp for ground-connecting a ground wire bundled with an electrical wire group in a wire harness sheathed with a corrugated tube to a vehicle body panel. The corrugated clamp may be integrally molded from a conductive resin material and includes a base section, a lid section, and a bracket section. The base section and lid section are provided on their inner peripheral surfaces with concavo-convex portions to be fitted to an annular concavo-convex portion of the corrugated tube. The bracket section projects from an exterior of the base section to be engaged with the vehicle body panel. A ground wire is drawn out from the wire harness extending through the corrugated tube. A core wire is exposed from the ground wire by stripping an insulation sheath of the ground wire. The exposed core wire is brought into contact with an inner surface of the concavo-convex portion of the base section and is fixed between the inner surface of the base section and an outer surface of the corrugated tube. A latch piece projected from the vehicle body panel is inserted into and engaged with the bracket section to bring the bracket section into contact with the vehicle body panel, thereby electrically conducting the ground wire to the vehicle body panel.

With the corrugated clamp constructed as described above, it is not necessary to carry out a step of press-connecting the ground terminal to the ground wire and a step of bolt-fastening the ground terminal onto the vehicle body panel in a motor vehicle assembly line, thereby decreasing the bolt-securing positions onto the vehicle body. Also, since the corrugated clamp performs the function of ground-connecting to the vehicle body as well as the function of fixing onto the vehicle body, it is possible to simultaneously finish the step of securing the wire harness to the vehicle body panel and the step of electrically conducting the core wire of the ground wire to the vehicle body panel by a one-touch action of inserting the bracket section of the corrugated clamp into the latch piece of the vehicle body panel.

Further, since ground terminals, bolts, and nuts, which have been required to perform the conventional ground connection, are not necessary, and the number of parts can be reduced, the corrugated clamp can respond to manufacturers' demands for lowering the cost for a motor vehicle and decreasing the weight of a motor vehicle.

Preferably, the base section is provided on an end side with a projection. The projection is provided with a through-hole. The through-hole is configured to guide the ground wire drawn out from the wire harness from the exterior to an inner space in the base section. An insulation sheath at a distal end of the ground wire is stripped to expose the core wire when the ground wire passes the through-hole. The exposed core wire is arranged along an inner surface of the concavo-convex portion of the base section.

Thus, since by passing the ground wire from the exterior through the through-hole in the projection of the corrugated clamp it is possible to stably hold the insulation sheath in the through-hole with the distal end of the ground wire being directed to the inner side of the base section, it is possible to prevent stress from being applied to the contact portions between the core wire of the ground wire and the corrugated clamp, and to stabilize the electrical connection between the ground wire and the corrugated clamp.

The conductive resin material that forms the corrugated clamp may be selected from one of polyacetylene, polyaniline, polyporoll, and polythiophene. The corrugated clamp may be formed by method such as, for example, an injection molding method of the conductive resin.

As described above, according to the present invention, since the corrugated clamp is made of the conductive resin material, it is possible to simultaneously perform the steps of ground-connecting the wire harness to the vehicle body and fixing the wire harness to the vehicle body panel, by the one-touch action of mounting the bracket section of the corrugated clamp on the latch piece of the vehicle body. Thus, it is possible to eliminate the steps of connecting the ground terminal to the ground wire and of fastening the bolts onto the vehicle body panel. It is also possible to decrease the number of the bolt-fastening positions on the vehicle body panel.

Also since ground terminals, bolts, and nuts, that have been required for the conventional ground connection, are not needed and the number of parts can be reduced, the corrugated clamp can respond to manufacturers' demands for lowering a cost of a motor vehicle and for decreasing the weight of a motor vehicle.

BRIEF DESCRIPTION OF THE DRAWINGS

The above, and other objects, features and advantages of the present invention will be made apparent from the following description of the preferred embodiments, given as non-limiting examples, with reference to the accompanying drawings in which.

DETAILED DESCRIPTION OF THE INVENTION

Figure 1:
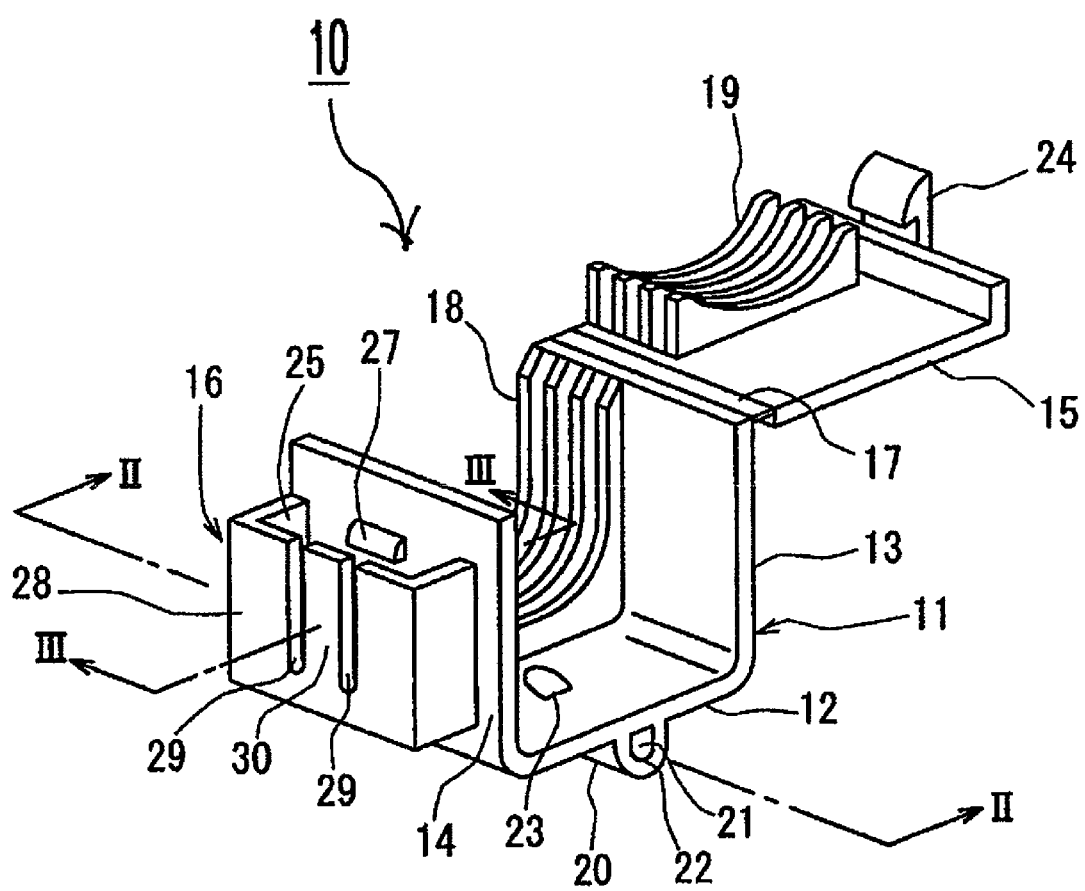
FIG. 1 is a perspective view of a first embodiment of a corrugated clamp in accordance with the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Referring now to the drawings, an embodiment of a corrugated clamp in accordance with the present invention will be described below.

FIGS. 1 to 6 show an embodiment of a corrugated clamp 10 in accordance with the present invention.

Figure 4A:
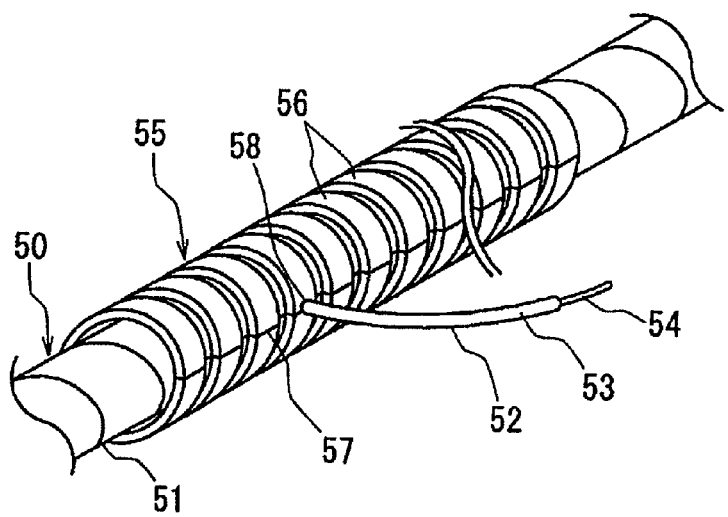
FIG. 4A is a perspective view of a corrugated tube to be fitted in the corrugated clamp of FIG. 1.
Figure 4B:
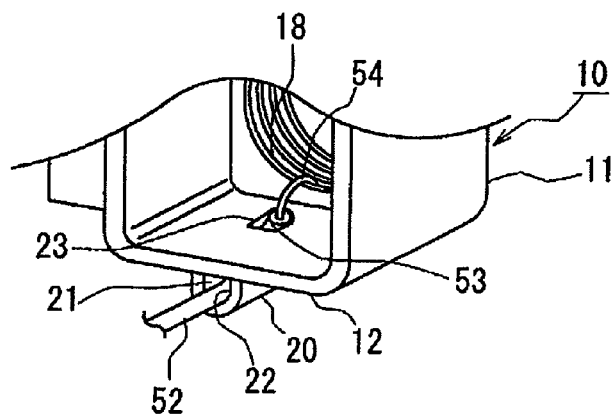
FIG. 4B is a partial perspective view of the corrugated clamp of FIG. 1.
Figure 4C:
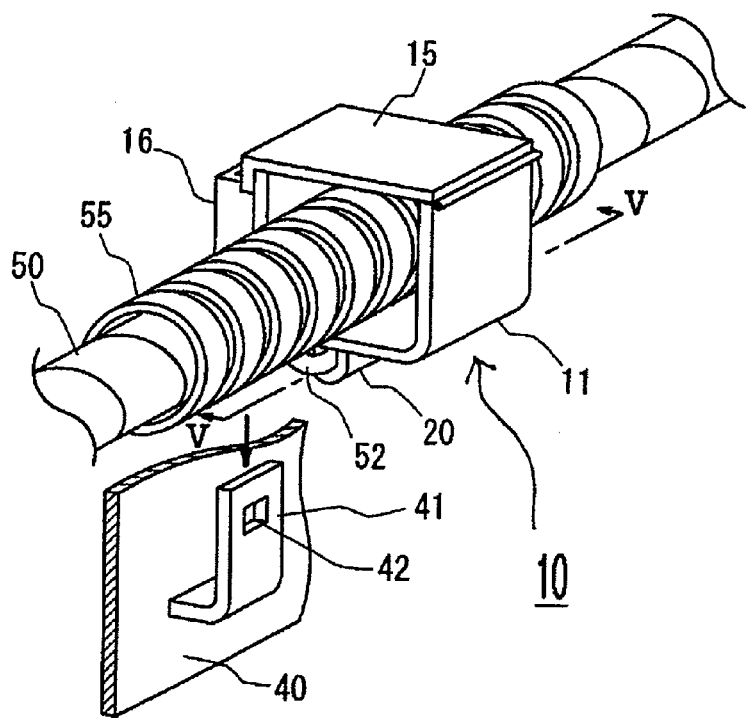
FIG. 4C is a partial perspective view of corrugated clamp of FIG. 1 with a corrugated tube fitted therein and illustrating the process of mounting the corrugated clamp to an outer periphery of the corrugated tube.

As shown in FIG. 4C, the corrugated clamp 10 is mounted on an outer periphery of a corrugated tube 55. The corrugated tube may be made of any suitable material such as, for example, a resin material. The corrugated tube 55 sheathes a wire harness 50 to be positioned in a motor vehicle. As shown in FIG. 4A, a ground wire 52 is bundled in the wire harness 50 together with an electrical wire group 51.

The corrugated tube 55 is provided with an annular concavo-convex portion 56 that extends continuously in an axial direction and has stiffness and deformability. The corrugated tube 55 is provided on the entire length thereof with a slit 57. An aperture 58 for drawing out the ground wire 52 is provided on a portion in the slit 57.

The corrugated clamp 10 may be formed by any suitable method and of any suitable material, and in the present embodiment, is integrally molded from a conductive resin material. As shown in FIG. 1, the corrugated clamp 10 includes a short trough shaped base section 11 including a bottom wall 12 and opposing side walls 13 and 14 defining a space for threading the wire harness 50, an openable lid section 15 for closing an upper opening of the base section 11, and a bracket section 16 for securing the base section to a vehicle body.

The lid section 15 is connected through a thin hinge 17 to an upper end edge of one side wall 13 of the base section 11. The bracket section 16 projects from an outer surface of the side wall 14 of the base section 11.

A concavo-convex portion 18 to be fitted to a concavo-convex portion 56 on the corrugated tube 55 is formed continuously on an inner surface from the bottom wall 12 to the opposing side walls 13, 14 of the base section 11 at one side in a wire harness threading direction. A concavo-convex portion 19 to be fitted to the concavo-convex portion 56 on the corrugated tube 55 is also formed on an inner surface of the lid section 15 at one side in the wire harness threading direction.

A projection 20 is provided on a rear side of the bottom wall 12 at the other side in the wire harness threading direction in the base section 11. An interior opening 23 described below is provided on an inner surface of the bottom wall 12 near the concavo-convex portion 18.

Figure 2:
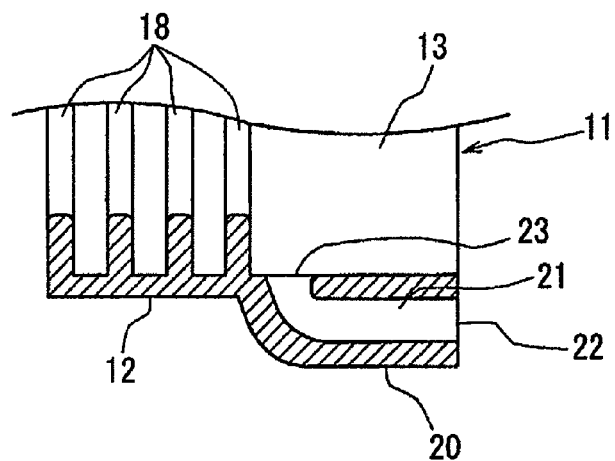
FIG. 2 is a cross sectional view of a main portion of the corrugated clamp of FIG. 1, taken along line II-II in FIG. 1.

The projection 20 is provided with a through-hole 21 extending through in the wire harness threading direction. In more detail, as shown in FIG. 2, the through-hole 21 is open at a first end thereof to be directed to an exterior of the base section 11, extends from the outward directed opening 22 to a central portion of the bottom wall 12, bends upward from the central portion of the bottom wall 12, penetrates the bottom wall 12, and is open at a second end thereof to define an inward directed opening 23 that communicates with the inner space in the base section 11.

The lid section 15 is provided on a free end thereof with a lock pawl 24 that is inserted into the bracket section 16 when the lid section 15 is in the closed position.

Figure 3:
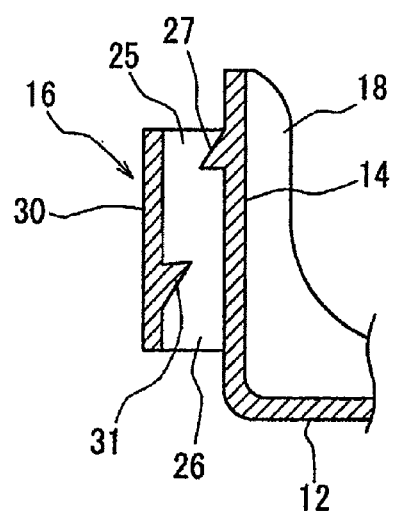
FIG. 3 is a longitudinal sectional view of a main portion of the corrugated clamp of FIG. 1, taken along line III-III in FIG. 1.

The bracket section 16 may be formed in a square frame. The bracket section 16 may be formed by any suitable forming method and in the present invention is formed integrally and in one piece with the side wall 14 of the base section 11. Further, in the present embodiment, the bracket section 16 is open at upper and lower ends thereof. As shown in FIG. 3, the upper end opening in the bracket section 16 defines a lock pawl insertion port 25 that receives the lock pawl 24 of the lid section 15, while the lower end opening in the bracket section 16 defines a latch piece insertion port 26 that receives a latch piece 41 projecting from a vehicle body panel 40.

As shown in FIGS. 1 and 3, the bracket section 16 is provided on an upper part of an outer surface of the side wall 14 of the base section 11 with a pawl being locked 27 that is engaged with the lock pawl 24 of the lid section 15. The bracket section 16 is provided on a central part of an outer side wall 28 opposed to the side wall 14 with a deformable piece 30 that is disposed between two slits 29 extending downward from an upper end of the outer side wall 28 and that is connected to a lower end of the outer side wall 28. A latch projection 31 is provided on an inner surface of the outer side wall 28 of the bracket section 16 and is disposed at a position lower than the pawl being locked 27 of the deformable piece 30. The latch projection 31 is inserted into and engaged with a receiving aperture 42 in a latch piece 41 of the vehicle body panel 40.

Next, a working process of connection and fixing of a ground wire onto a vehicle body using the corrugated clamp constructed above will be described.

Initially, as shown in FIG. 4A, in a wire harness 50 assembly line, the ground wire 52 bundled with the wire harness 50 is drawn out from the aperture 58 in the slit 57 of the corrugated tube 55. An insulation sheath 53 on a distal end of the drawn ground wire 52 is stripped beforehand to expose a core wire 54.

Secondly, as shown in FIG. 4B, the distal end of the ground wire 52 is inserted through the outward directed opening 22 into the through-hole 21 in the corrugated clamp 10. The exposed core wire 54 exits the inward directed opening 23 to the inner surface of the base section 11. The ground wire 52 is fed into the through-hole 21 until the insulation sheath 53 on the ground wire 52 is pushed far into the through-hole 21. The core wire 54 is drawn out in the wire harness threading direction and positioned on the concavo-convex portion 18 of the base section.

Thirdly, as shown in FIG. 4C, the corrugated tube 55 that sheathes the wire harness 50 is threaded into the space defined in the base section 11 of the corrugated clamp 10, the core wire 54 is clamped and fitted between the concavo-convex portion 18 of the base section 11 and the concavo-convex portion 56 of the corrugated tube 55. Under this condition, the lid section 15 is put on the upper part of the base section 11 so that the concavo-convex portion 19 of the lid section 15 is fitted to the concavo-convex portion 56 of the corrugated tube 55. Then, as shown in FIG. 6, the lock pawl 24 on the lid section 15 is inserted into the lock pawl insertion port 25 in the bracket section 16 to engage the lock pawl 24 to lock 27 the pawl.

Figure 5:
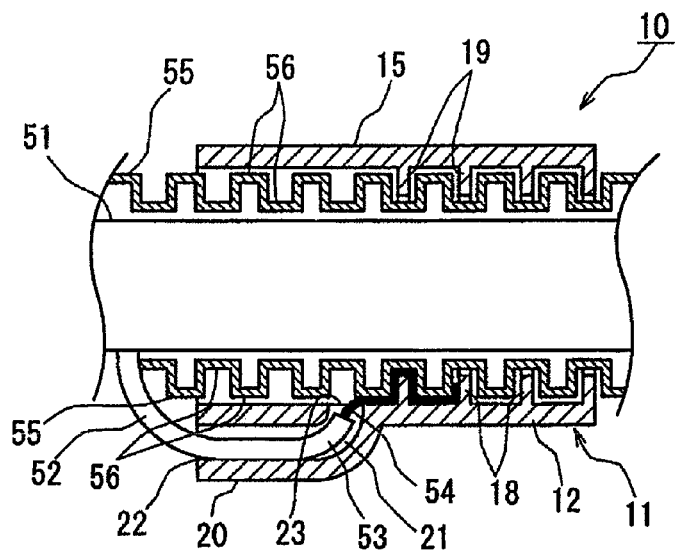
FIG. 5 is a longitudinal sectional view of the corrugated clamp of FIG. 1 and the corrugated tube taken along lines V-V in FIG. 4C.

Consequently, as shown in FIG. 5, the core wire 54 of the ground wire 52 is pressed on the outer surface of the concavo-convex portion 56 of the corrugated tube 55, so that the core wire 54 is brought into contact with the inner surface of the concavo-convex portion 18 of the corrugated clamp 10. Then, the ground wire 52 is electrically conducted to the corrugated clamp 10.

As describe above, the wire harness 50 is sheathed with the corrugated tube 55 and the corrugated clamp 10 is mounted on the corrugated tube 55. In this manner, the wire harness 50 is arranged on the vehicle body in a motor vehicle assembly line of a motor vehicle.

Figure 6:
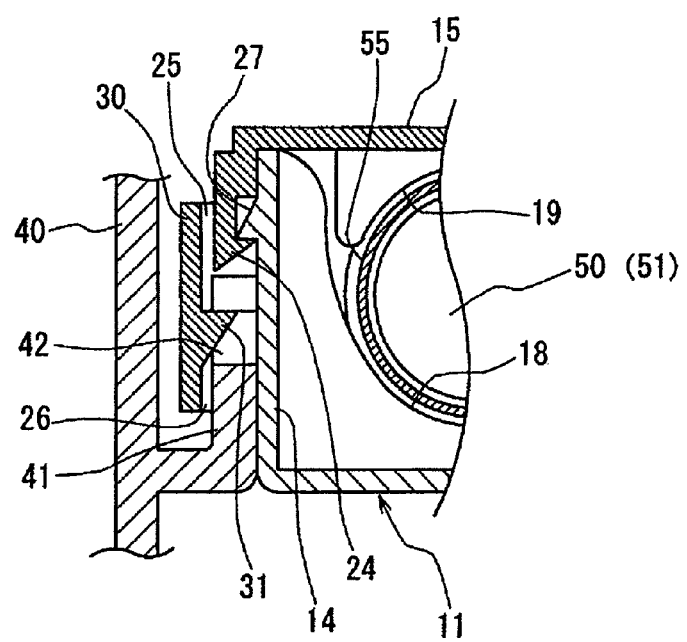
FIG. 6 is a cross sectional view of a main portion of the corrugated clamp of FIG. 1, illustrating a wire harness secured to a vehicle body panel by the corrugated clamp.
Figure 7:
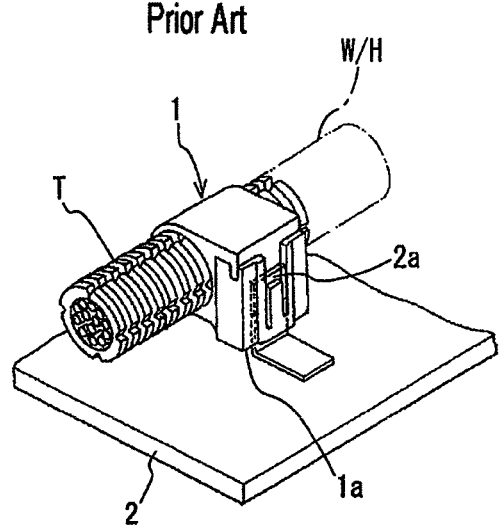
FIG. 7 is a perspective view of a corrugated clamp of the prior art.
Figure 8:
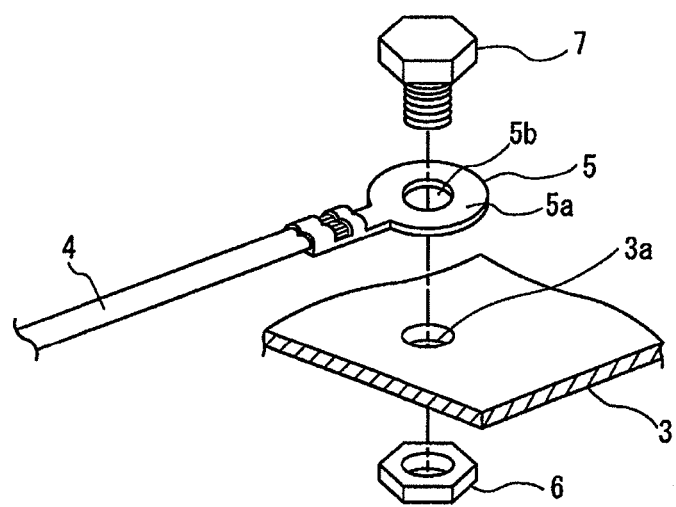
FIG. 8 is a perspective view of a conventional ground wire, illustrating a process for attaching the ground wire to a vehicle body.

As shown in FIG. 6, when the wire harness 50 is arranged on the vehicle body, the corrugated clamp 10 is coupled to the vehicle body panel 40 by receiving the L-shaped latch piece 41 integrated with the vehicle body panel 40 into the latch piece insertion port 26 in the bracket section 16. Consequently, the latch projection 31 of the bracket section 16 is inserted into the engaging aperture 42 in the latch piece 41, the wire harness 50 is secured to the vehicle body panel 40, and at the same time the corrugated clamp 10 made of a conductive resin material is electrically conducted to the vehicle body panel 40.

Thus, the corrugated clamp 10 of the conductive resin material directly contacts and is electrically connected to both the ground wire 52 and vehicle body panel 40. The ground wire 52 can be electrically connected through the corrugated clamp 10 to the vehicle body panel 40. Accordingly, conventional steps of press-connecting a ground terminal to a ground wire and fastening bolts on a vehicle body panel are not required and the number of bolt apertures to be provided in the vehicle body can be reduced, and the fastening operation of the bolts are decreased.

It is possible to reduce a manpower and improve efficiency, since the steps of fixing the wire harness onto a vehicle body and ground connection onto the vehicle body can be done and finished simultaneously by a simple one-touch action of pushing the corrugated clamp 10 onto the latch piece 41 of the vehicle body panel 40.

Furthermore, since the corrugated clamp 10 has the function of ground connection onto the vehicle body as well as a fixing onto the vehicle body, ground terminals, bolts, and nuts, that have been required for conventional ground connection, are not needed. It is also possible to reduce the number of parts, to lower the motor vehicle cost, and to decrease the weight of a motor vehicle.

Since the distal end of the ground wire 52 is inserted into the through-hole 21, it is possible to hold the insulation sheath 53 in the through-hole 21 with the core wire 54 of the ground wire 52 being guided onto the inner surface side of the base section 11, to prevent high stress from being applied to the core wire 54 clamped and fixed between the corrugated clamp 10 and the corrugated tube 55, and to stabilize an electrically conducting state between the core wire 54 and the corrugated clamp 10.

The exposed core wire 54 of the ground wire 52 may be inserted into a space between the concavo-convex portions of the corrugated clamp and tube to bring the core wire into contact with the corrugated clamp without providing the through-hole for guiding the ground wire 52 in the corrugated clamp.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A corrugated clamp for ground-connecting a ground wire bundled with an electrical wire group in a wire harness sheathed with a corrugated tube, said corrugated clamp comprising:
   a base section and a lid section, said base section and said lid section including on inner peripheral surfaces thereof concavo-convex portions, said concavo-convex portions configured to be fitted to an annular concavo-convex portion of the corrugated tube;
   wherein a ground wire extends out from the wire harness extending through the corrugated tube, and an exposed core wire extending from the ground wire contacts said inner surface of said concavo-convex portion of said base section and is fixed between said inner surface of said base section and an outer surface of the corrugated tube.

2. The corrugated clamp according to claim 1, wherein said base section is provided on a bottom surface thereof with a projection, said projection including a through-hole, said through-hole configured to guide the ground wire from the wire harness from an exterior space to an inner space in said base section.

3. The corrugated clamp according to claim 2, wherein an insulation sheath at a distal end of the ground wire is stripped to expose the core wire when the ground wire passes through said through-hole in said projection, and the exposed core wire is positioned along an inner surface of said concavo-convex portion of said base section.

4. The corrugated clamp according to claim 1, said corrugated clamp being molded integrally and in one piece from a conductive resin material.

5. The corrugated clamp according to claim 1, wherein said corrugated clamp ground-connects the ground wire bundled with an electrical wire group in a wire harness sheathed with a corrugated tube to a vehicle body panel.

6. The corrugated clamp according to claim 1, further comprising:
   a bracket section projecting from an exterior of said base section, said bracket section configured to be engage a vehicle body panel.

7. The corrugated clamp according to claim 6, wherein said bracket section projects from a side panel surface of said base section.

8. The corrugated clamp according to claim 6, said bracket section configured to receive a latch piece projecting from the vehicle body panel.

9. The corrugated clamp according to claim 8, said bracket section configured to receive the latch piece such that the latch piece is inserted into and engaged with said bracket section to bring said bracket section into contact with the vehicle body panel, thereby electrically connecting the ground wire to the vehicle body panel.

* * * * *